(12) United States Patent
Askerdal

(10) Patent No.: US 10,124,790 B2
(45) Date of Patent: Nov. 13, 2018

(54) METHOD PERFORMED BY A CONTROL UNIT TO CONTROL ENERGY FLOWS OF A VEHICLE

(71) Applicant: VOLVO TRUCK CORPORATION, Göteborg (SE)

(72) Inventor: Mikael Askerdal, Frillesås (SE)

(73) Assignee: Volvo Truck Corporation, Göteborg (SE)

( * ) Notice: Subject to any disclaimer, the term of this patent is extended or adjusted under 35 U.S.C. 154(b) by 29 days.

(21) Appl. No.: 15/506,172

(22) PCT Filed: Sep. 26, 2014

(86) PCT No.: PCT/EP2014/002613
§ 371 (c)(1),
(2) Date: Feb. 23, 2017

(87) PCT Pub. No.: WO2016/045688
PCT Pub. Date: Mar. 31, 2016

(65) Prior Publication Data
US 2017/0274889 A1    Sep. 28, 2017

(51) Int. Cl.
*B60W 20/00* (2016.01)
*G06F 7/00* (2006.01)
(Continued)

(52) U.S. Cl.
CPC ............ *B60W 20/11* (2016.01); *B60W 10/06* (2013.01); *B60W 10/08* (2013.01); *B60W 10/26* (2013.01);
(Continued)

(58) Field of Classification Search
CPC ...... B60W 20/12; B60W 10/06; B60W 10/08; B60W 10/26; B60W 10/30; B60W 30/188; B60W 50/0097; B60W 50/0098
(Continued)

(56) References Cited

U.S. PATENT DOCUMENTS

| 2008/0319595 A1 | 12/2008 | Yamamoto et al. |
| 2010/0312430 A1 | 12/2010 | Troncoso et al. |

(Continued)

FOREIGN PATENT DOCUMENTS

| DE | 10226143 A1 | 1/2004 |
| DE | 102009030784 A1 | 2/2010 |

(Continued)

OTHER PUBLICATIONS

International Search Report (dated May 20, 2015) for corresponding International App. PCT/EP2014/002613.
(Continued)

*Primary Examiner* — Maceeh Anwari
(74) *Attorney, Agent, or Firm* — WRB-IP LLP

(57) ABSTRACT

A method performed by a control unit for managing energy flows within an energy system of a vehicle is provided. The energy system includes a plurality of energy subsystems connected by converters. The converter can convert energy of one energy form from one energy subsystem to energy of another energy form of another energy subsystem. At least one energy subsystem includes an energy buffer. According to the method performed by a control unit vehicle travel route information is collected for a predefined travel route whereby the travel route can be divided in part routes. By estimating an energy consumption over respective part route for each energy buffer an estimated energy buffer price for respective part route can be calculated by the control unit. The estimated energy buffer price can subsequently be used such that energy can be provided between energy subsystems such that the available energy for a part route can be distributed within the energy system of the vehicle in the most efficient way by the control unit and the usage of respective energy buffer can be optimized.

14 Claims, 3 Drawing Sheets

(51) Int. Cl.
- *G06F 19/00* (2018.01)
- *G01S 19/42* (2010.01)
- *G01C 21/34* (2006.01)
- *B60W 20/11* (2016.01)
- *B60W 50/00* (2006.01)
- *B60W 10/06* (2006.01)
- *B60W 10/08* (2006.01)
- *B60W 10/30* (2006.01)
- *B60W 30/188* (2012.01)
- *B60W 20/12* (2016.01)
- *B60W 10/26* (2006.01)
- *B60W 50/06* (2006.01)

(52) U.S. Cl.
CPC ............ *B60W 10/30* (2013.01); *B60W 20/12* (2016.01); *B60W 30/188* (2013.01); *B60W 50/0097* (2013.01); *B60W 50/0098* (2013.01); B60W 2050/0002 (2013.01); B60W 2050/0075 (2013.01); B60W 2050/065 (2013.01); B60W 2550/402 (2013.01); Y02T 10/56 (2013.01); Y02T 10/6291 (2013.01); Y02T 10/84 (2013.01)

(58) Field of Classification Search
USPC .......................................................... 701/22
See application file for complete search history.

(56) References Cited

U.S. PATENT DOCUMENTS

| | | |
|---|---|---|
| 2011/0066308 A1 | 3/2011 | Yang et al. |
| 2012/0029747 A1 | 2/2012 | Katoh et al. |
| 2012/0323413 A1 | 12/2012 | Kedar-Dongarkar et al. |

FOREIGN PATENT DOCUMENTS

| | | |
|---|---|---|
| DE | 102010030247 A1 | 12/2011 |
| JP | 2000321081 | 11/2000 |
| JP | 2006333556 | 12/2006 |
| JP | 2010280335 | 12/2010 |
| JP | 2011508699 A | 3/2011 |
| JP | 2014517193 A | 7/2014 |
| WO | 2012155927 A1 | 5/2011 |

OTHER PUBLICATIONS

Japanese Official Action (dated Aug. 7, 2018) for corresponding Japanese App. 2017-516382.

METHOD PERFORMED BY A CONTROL UNIT TO CONTROL ENERGY FLOWS OF A VEHICLE

BACKGROUND AND SUMMARY

The present invention relates to the field of methods for managing energy flows within an energy system of a vehicle. The invention can be applied in heavy-duty vehicles such as trucks and busses, as well as for other type of vehicles such as passenger cars.

Due to increasingly stringent legislation and an increasing interest from the market fuel efficiency has been one of the main drivers for passenger cars for many years. However, today fuel efficiency is one of the main drivers not only for passenger cars but also for heavy duty vehicles and other commercial vehicles. The combustion engine and the powertrain has been refined for many years, and it is becoming more and more difficult to make large improvements in order to improve the fuel efficiency. Instead all aspects of the engine, the powertrain and the control functionalities have to be considered. All small improvements, especially if the improvement can be achieved without adding substantial cost, are important and worth to pursue.

One possible approach for improving the fuel efficiency is by implementing a control method optimising the energy management of the energy system of a vehicle such that no more power than what is required at a certain time is produced, that the available total amount of power at a certain time is distributed in the energy system in the most efficient way and that the available total amount of power is used in the best possible way. How much power that needs to be produced, where in the energy system and how this power should be consumed or stored is however far from trivial to determine. There are many energy systems, components or functionalities of a vehicle that consume energy. A significant portion of the available energy is naturally used for the propulsion of the vehicle but auxiliary systems such as power steering, vehicle lights and vehicle climate systems also consume a large portion. More or less all different consumers of energy of an energy system are affecting one another and therefore cannot be considered independently. Also, the circumstance during which the optimisation is to be performed is changing continuously. This makes the tuning process of the control method time consuming and complex, and since it is directly dependent on the present setup it needs to be redone at the slightest change of the setup.

WO 2012155927 discloses an energy management system of a vehicle wherein activation agents control the energy flows within the vehicle. The activation agents control main systems and auxiliary systems of the vehicle by adapting pricing rules. The energy is traded between the energy main systems and the auxiliary systems. The price of energy varies depending on the momentary supply of energy for the vehicle. Each main system has a price at which it will provide energy and each auxiliary system has an individual price limit up to which the auxiliary system will purchase energy. Above this individual price limit the auxiliary system will not purchase any energy. Some auxiliary systems have variable individual price limits and some auxiliary systems have fixed individual price limit The price of energy is dependent on the amount of available energy, and based on the individual price limits of respective auxiliary system the activation agents of the main systems and auxiliary systems decides whether respective system should be activated or not.

It is desirable to provide an improved method performed by a control unit for managing the energy flows within an energy system of a vehicle, especially a method where information regarding upcoming travel route is used in order to control the energy flows such that available energy can be used more efficiently. The present invention further comprises, according to aspects thereof, a computer program comprising program code means for performing the steps of the method when the program is run by a control unit and a computer readable medium carrying such a computer program.

Control methods for optimising energy utilisation are preferably run by control units. Vehicles of today comprise numerous control units controlling different functionalities of the vehicle such as e.g. TCU, Transmission Control Unit, primarily controlling the transmission or BCU, Brake control unit, primarily controlling the braking system. Also many single components comprise local controllers controlling the functionality of respective component, such as e.g. a brake actuator or a hydraulic or electric actuator of a power steering. The different control units and local controllers interact in order to control the vehicle such that the actual control of the vehicle is performed not by one single control unit but by a network of control units, i.e. distributed vehicle control. Thus, when referring to control unit herein this necessarily does not mean that the method or like is performed by one single control unit, but that the method may be performed by a distributed control unit comprising numerous interacting control units and local controllers. This is also referred to as the computer of the vehicle. A computer is by definition a programmable electronic device that can retrieve, store, process and redistribute information, thus the same operations as the control unit, being a single component or a network of interacting components, is provided to perform.

According to an aspect of the present invention the energy system of the vehicle comprises a plurality of energy subsystems. In every energy subsystem one specific form of energy, such as e.g. mechanical energy, electrical energy, pneumatic energy, heating energy or cooling energy is used. Each energy subsystem comprises at least one energy consumer, at least one energy producer and at least one converter which are common for at least two energy subsystems. Further, at least one of the energy subsystems comprises at least one energy buffer. The energy subsystems are operationally connected by converters, wherein converters are devices which are converting at least one form of energy to at least another form of energy. Converters enable that energy can be provided between different energy subsystems using different forms of energy.

If a single first energy subsystem is considered there is at least one converter converting energy from another energy subsystem to the first energy subsystem and at least one converter converting energy from the first energy subsystem to another energy subsystem. For the first energy subsystem the converter that converts energy to the first energy subsystem acts as a producer and the converter converting energy from the first energy subsystem acts as a consumer. For a single energy subsystem one can talk about energy producers and energy consumers, but when considering the complete energy system such energy producers and consumers are merely converters acting as a producer in one energy subsystem and as consumer in another energy subsystem. A converter of an energy subsystem may act as a producer for that energy subsystem at times and as a consumer for the energy subsystem at other times.

As will be apparent throughout the following description there may be more than one way to define an energy subsystem as long as certain criteria, presented herein, are fulfilled. The degree of implementation of the method, meaning to what level of detail the method is implemented, may be dependent on the balance between energy usage optimization and need of computational power for applying the method.

The energy subsystems may also comprise energy buffers. Energy buffers are energy storages that are able to store energy provided from respective energy subsystem when there is a surplus of energy within that energy subsystem and that possibly are able to provide energy to respective energy subsystem when there is a need of energy within the energy subsystem. During normal operation of a vehicle the vehicle will at times be driven at conditions where there is either shortage of available energy within the energy system of the vehicle or where there is a surplus of energy within the energy system of the vehicle. Every vehicle comprises a number of energy buffering vehicle components. Such components may either possess energy buffering properties since that is the purpose of that component, such as for an electrical battery being capable of buffering electrical energy, or indirectly since there is an inherent inertia in the component, such as e.g. for a liquefied cooling system being inherently capable of buffering cooling or heating energy.

Looking at the example of an energy buffer in form of an electrical battery, where the quantity of stored energy is the current state of charge (SoC) of that electrical battery. For the example with an electrical battery electrical energy is stored in the form of chemically stored energy when the electrical battery is charged. When the electrical battery is discharged the chemically stored energy is converted back to electrical energy provided to the electrical energy subsystem. Thus, electrical energy is the form of energy provided to the electrical battery when being charged and provided by the electrical battery at discharging, but between charging and discharging the energy has been converted to chemical energy. In the method according to an aspect of the present invention energy buffers are also considered to be energy converters. The function of an energy buffer when producing energy to an energy subsystem or consuming energy from an energy subsystem is the same as for a converter. Thus, if nothing else is said what concerns converters also concerns energy buffers. Other energy buffers acts as direct converters. Such converters with energy buffering capacity both converts one form of energy into another form of energy and are able to store either form of energy during at least a certain period of time. An example of such a converter with energy buffering capacity is the cooling system of a combustion engine. A conventional combustion engine cooling system generally comprises a pump and a cooling fan used for cooling the cooling fluid circulated by the pump in accompanying cooling fluid circuit. If the fluid is cooled down by driving the cooling fan the fluid will uphold its cooling capacity for a period of time, thus have a cooling energy buffering effect.

The control unit runs the method according to an aspect of the present invention with a first sample frequency and a respective unitary energy price for respective energy subsystem is set by the control unit for a first sample interval t+n. The unitary energy price of respective energy subsystem is set using any available pricing method. This will be discussed more in detail later. The method performed by the control unit is characterised in that the control unit, during a second sample frequency having a second sample interval of t+m, is:

collecting vehicle travel route information for a predefined travel route, and dependent on said collected vehicle travel route information is:

defining an upcoming part route, wherein the upcoming part route is a section of the predefined travel route, estimating an energy consumption over said part route for each energy subsystem, wherein the estimated enemy consumption is based upon said vehicle travel route information, calculating a predictive energy buffer price for respective energy buffer for the part route, wherein the calculated predictive energy buffer price is dependent at least on the previously estimated energy consumption, and setting a respective energy buffer price to be the predicted energy buffer price during the next second sample interval t+m.

For energy subsystems comprising at least one energy buffer said unitary energy price of the energy subsystem is dependent on respective energy buffer price.

Thus, the estimated energy consumption for respective part route is summed up to an estimated energy consumption for the complete travel route. The energy consumption over the travel route is used to calculate a predictive energy buffer price over the travel route for each energy buffer.

The predictive energy buffer price is set to be an energy buffer price which is used as input for determining respective unitary energy price for respective energy subsystem. Setting the energy buffer price is performed according to the second sample interval t+m. Thus, when referring to different ways of determining an energy buffer price what is referred to is the predictive energy buffer price, calculated using the vehicle travel route information, set to be the energy buffer price.

Additionally, based on determined unitary energy prices during said first sample interval t+n the control unit subsequently is:

providing a quantity of power to a first energy subsystem from a second energy subsystem.

The provided quantity of power corresponds to a determined supplied quantity of power of said common converter at the unitary energy price of said first energy subsystem. Thus, the unitary energy prices of respective energy subsystem are used to determine if and to what extent energy should be transferred between respective energy subsystems. The transfer of energy is performed by energy converters converting one form of energy from one energy subsystem to another form of energy of another energy subsystem. This is performed according to the first sample frequency t+n.

The quantity of power provided from one energy subsystem to another energy subsystem is limited by a power limitation of respective common converter. When the control unit controls the energy flows of an energy system of a vehicle according to the method according to an aspect of the present invention that enables that the overall available energy may be used, including possible additions of energy from e.g. regeneration or like over a predefined travel route, when driving a predefined travel route in the most energy efficient way. Additionally, the method enables energy buffers to be used in a more efficient way because the energy usage can be predicted over a longer period of time, wherein it is possible to set the energy buffer prices such that the charging and discharging of respective energy buffer is optimized.

Thus, vehicle travel route information is collected by the control unit for a predefined travel route. The predefined travel route is a predicted route, wherein the predicted route is the route that, based on e.g. current vehicle position, vehicle speed, driving direction, road network etc. it is most probable that the vehicle will drive. The predefined travel route may also be based on historically frequently driven routes. Any deviations from the predefined travel route will result in that a new most probable route is predicted and a new predefined travel route is defined. Thus, at deviations from the predefined travel route the control unit runs the method according to an aspect of the present invention with new input. That vehicle travel route information is used by the control unit to divide the predefined travel route in part routes. Based on the vehicle travel route information available for respective part route the control unit determines an estimated energy consumption for respective part route.

The energy used over the predefined travel route and over respective part route comprises various types of energy consumption. The main part of the energy is consumed by the propulsion system of the vehicle, wherein this energy consumption is highly dependent on the topography of the predefined travel route, vehicle speed, wind and rolling resistance and vehicle load. Another type of energy is electrical energy needed for uncontrollable energy consumers such as e.g. head lights and air condition systems. Pneumatic energy is needed e.g. for brakes and suspension. Additionally, cooling and heating energy is needed for cooling of e.g. ICE components and cooling/heating of the vehicle compartment. These are examples of relevant parameters considered when calculating the estimated energy consumption. Driving uphill may e.g. require a significant amount of energy in order to cool ICE components whereas when driving downhill pneumatic systems may require additional energy due to an increased need of braking.

According to the method the total energy consumption of each energy type over the predefined travel route is estimated based on available vehicle travel route information by applying a sustainability condition stating that energy stored with respective energy buffer should be kept within the maximum and minimum charge limits for respective energy buffer.

Except for position information from e.g. GPS services, preferably in connection to road information databases, the vehicle travel route information may also comprise information regarding e.g. weather and ambient conditions. Also information sources such as information shared within vehicle fleets, traffic information services and historical consumption data can be used as at least part of the vehicle travel route information.

It will be possible to charge respective energy buffer during a part route when charging is more beneficial than in the subsequent part route and to discharge respective energy buffer during part routes with high energy demands. By being aware of if a distance where charging or discharging is possible is approaching the current SoC of respective energy buffer can be used more efficiently. Knowledge of the future enables e.g. energy buffers to be essentially drained if it is known that it is possible to recharge the energy buffers soon.

The previously mentioned possible pricing methods that could be run by a control unit for setting a unitary energy price may be any suitable out of the many pricing methods available. Methods used by control units for calculating unitary energy prices are typically either looking at previous events to determine what price that is likely to sustain the buffer level in the long run or are trying to predict how the price should be set. For energy systems comprising at least one energy buffer one simple pricing method could be to simply set the unitary energy price as a function of the current amount of energy stored in respective energy buffer. For an example where the only energy buffer of an energy system is an electrical battery the unitary energy price would then be a function of the SoC of that electrical battery. Generally, the higher the current amount of stored energy is the lower will the unitary energy price of energy from that energy subsystem be. According to a development of this pricing method the momentary energy flow to an energy buffer, or from an energy buffer, may also be considered. Another possible pricing method is provided by using model predictive control, relying on e.g. dynamic models of linear empirical models obtained by system identification. Yet other possible pricing methods, using more advanced and computationally intensive pricing methods are available, e.g. based on dynamic programming.

The pricing methods that may be used by the control unit when applying aspects of the present invention all have in common that the energy buffer price is considered when the control unit is calculating respective unitary energy price.

According to one aspect the first sample interval t+n is shorter than said second sample interval t+m. Generally, respective energy buffer price, which is updated by the control unit according to the second sample interval t+n, changes more gradually than the unitary energy prices of energy subsystems may do. Thus, by setting the second sample interval t+m to be longer than the first sample interval t+n, which requires less frequent recalculations of e.g. respective energy buffer price, less computational power is required by the control unit but such longer sample interval still captures important energy buffer price movements at an early stage.

According to one aspect a complete simulation of the energy used, and possibly generated, when driving the predefined travel route is performed by the control unit. By defining part routes and calculate energy consumption over respective part route the energy consumption over the predefined travel horizon is obtained. From the energy consumption over the predefined travel route a predicted energy buffer price is calculated which can be set as the energy buffer price used when the control unit is determining how energy should be distributed within the energy system.

According to yet one aspect the determination of an energy buffer price for each energy subsystem comprising at least one energy buffer is directly dependent on the energy consumption over the part route and specifically on a length of said part route. The energy consumption and the length of the part route give an average consumption per actually travelled distance. By that the control unit previously has performed a mapping of energy buffer prices against average consumption an energy buffer price corresponding to the average consumption can be obtained. The higher the average consumption is the higher will the obtained energy buffer price be.

According to another aspect of the present invention said determining of an energy buffer price for each energy subsystem, performed by the control unit, is dependent on a calculated average energy buffer price for said vehicle travel route over the complete predefined travel route. According to yet another aspect of the present invention said average energy buffer price is calculated dependent on at least one of; the whole upcoming travel route, a historical average buffer energy price and/or at least one average buffer price for a similar part route. According to still other aspects of the present invention said energy buffer price is further dependent on an actual SoC of a buffer at a beginning of a time period t+m and/or on a desired SoC of respective energy buffer at an end of said part route.

In an example where the energy buffer is in form of an electrical battery;

At certain conditions it may be desirable to take the initial SoC in consideration when the control unit is calculating the energy buffer price. This is e.g. the case if the initial SoC is either very low or very high. In such cases the energy buffer may be in position to only be either charged or discharged. It may also be desirable to take the SoC in the end of the part route in consideration. If e.g. it is known that the end of the part route is at a location which offers the possibility to charge the electrical battery by plug-in functionality it might be acceptable to completely discharge the electrical battery over the part route. On the other hand, if it e.g. is known that the end of the part route is topologically located such that additional propulsion power will be needed at take-off, a partly charged electrical battery might be required at the end of the part route. This is all decided by the control unit.

According to one aspect of the present invention the charging or discharging of an energy buffer may be controlled by adding a penalty term to the calculation of the energy buffer price when the energy buffer is close to either being fully charged or discharged. This is done in order to achieve the desired charge or discharge.

According to one other aspect of the present invention said upcoming part route is dependent on at least a topography of an upcoming vehicle travel route and a desired SoC at a specific point of said upcoming part route.

Part routes are preferably set by the control unit to be as long as possible where a constant energy buffer price can be set without violating the maximum and minimum limits of respective energy buffer. The setting of break points separating the part routes is preferably mainly dependent on the topography. If the overall topography comprises a plurality of ups and downs the part routes can be set by the control unit to include the near future up to a point where either a long downhill or uphill run ends. It is desirable to define as long part routes as possible over which an essentially even charging or discharging is performed. Long part routes implies less charging and discharging operations, which for some energy buffers such as electrical batteries will increase the durability. If an essentially flat road section is provided in connection to an uphill section the flat section is preferably incorporated in the part route of the adjacent uphill section.

According to one preferred aspect of the present invention the break points are set by the control unit at a predetermined distance after the end of a downhill run and also at a predetermined distance after the end of an uphill climb. The break points may also be set a predetermined time after the end of a downhill run or after the end of an uphill climb. After a downhill run, during which the ICE load is low, it is likely that the driver utilizes the high kinetic energy of the vehicle to cruise for a period of time. During cruising the ICE load remains low. After an uphill climb, during which the ICE load is high and the vehicle speed may gradually decrease, it is likely that the driver would like to accelerate. During acceleration the ICE load is high. Since it is preferred to set the part routes according to degree of energy consumption or energy generation such periods of time after a downhill run or an uphill climb, where the ICE load is essentially the same as during preceding road section, preferably are included in preceding part route.

In an example with a cooling thermal energy buffer:

If a part route is set by the control unit to end at the top of an uphill run the energy buffer price of a thermal energy buffer must be set high enough so that respective component the thermal energy buffer is intended to cool is not overheated when driving up said uphill run. If a part route is set to end after a long downhill run the energy buffer price must be set low enough to avoid overcooling.

The energy buffer price is continuously updated by the control unit, but ideally the initially set energy buffer price stays essentially constant over the part route. A constant energy buffer price implies that the energy buffer price is set correctly. This means that the energy buffer price is set such that during a flat section followed by an uphill slope the energy buffer is steadily charged during the flat section and subsequently steadily discharged during the following uphill drive. However, when driving the part route unpredictable events may occur. The vehicle may e.g. have to slow down due to heavy traffic or the need of energy for e.g. air condition may be larger than expected. Also, the vehicle travel route information on which the energy consumption, and consequently probably also the energy buffer price, is based may not completely accurate. In such cases the energy buffer price may be updated by the control unit while driving the part route. The continuous updating of the energy buffer price guarantees that the currently used energy buffer price is accurate even if unexpected events occur while driving.

According to another aspect of the present invention said upcoming part route is further dependent on a predictive vehicle speed profile. The vehicle speed profile may first and foremost be adapted to fully utilize passages where regeneration during deceleration is possible, but may also be adapted such that as high average vehicle speed as possible is obtainable.

According to yet another aspect of the present invention the defining of said upcoming part route, performed by the control unit, is further dependent on buffer maximum and minimum values such that predetermined buffer parameters are held within these maximum and minimum values. Taking respective buffer maximum and minimum SoC limits into consideration enables that the energy system can be optimally utilized. Also, for certain energy buffers, such as an electrical battery, a functionality limiting the maximum and minimum SoC may prolong the lifetime of the energy buffer.

As previously discussed possible methods used by the control unit for setting the unitary energy price may be any suitable out of the many pricing methods available. According to one preferred aspect a pricing method derived from the Marshallian micro economics theory based on supply and demand is used.

By applying aspects of the Marshallian micro economics theory, herein referred to as the theory of supply and demand, for setting the unitary energy prices of respective energy subsystem it is possible to obtain the momentary optimum energy balance for the energy system where the energy needs and quantities of available power of respective energy subsystems are in balance. According to such pricing method each producer producing any form of energy is provided with an energy supply-price function, wherein the energy supply-price function is providing the relation between price and quantity for the power respective energy producer is able to provide to an energy subsystem. The efficiency of an energy converter, which here is considered as an energy producer, is dependent on the amount of converted power. Thus an energy supply-price function is describing how the unitary energy price of that energy producer changes with supplied quantity of power from respective producer.

Further, each consumer consuming any form of energy is provided with an energy demand-price function, wherein the energy demand-price function is providing the relation between price and quantity fur the power respective energy consumer demands from an energy subsystem. As previously stated the efficiency of an energy converter, which here is considered as an energy consumer, is dependent on the amount of converted power. Thus, an energy demand-price function is describing how the unitary energy price of an energy consumer changes with consumed quantity of power.

If an energy buffer is present in an energy subsystem the energy buffer acts as consumer if said buffer is provided with energy from said energy subsystem and as a producers if said energy buffer is providing energy to said energy subsystem.

Respective energy supply-price function and respective energy demand-price function is dependent on parameters specific for respective energy producer and energy consumer.

By that the control unit is summarising all energy supply-price functions, of all components possibly acting as producers of an energy subsystem it is possible to obtain an aggregated energy supply-price function describing the total energy supply of respective energy subsystem. Correspondingly, by summarising all energy demand-price functions of all components possibly acting as consumers it is possible to obtain an aggregated energy demand-price function describing the total energy demand of respective energy subsystem.

If an energy buffer is present such energy buffer will contribute both with an energy supply-price function and an energy demand-price function for respective energy subsystem, since such energy buffer potentially may act as either a producer or a consumer within said energy subsystem.

By that the control unit is comparing said aggregated supply-price function and said aggregated demand-price function of an energy subsystem it is possible to obtain the optimum unitary energy price of that energy subsystem, where there is balance between energy supply and energy demand of all producers, consumers and energy buffers of respective energy subsystem. This optimum unitary energy price is where the aggregated supply-price function and the aggregated demand-price function coincide.

The unitary energy price of an energy subsystem calculated by applying the theory of supply and demand can be used as unitary energy price when the control unit is applying the method according to an aspect of the present invention.

The present invention also comprises, according to an aspect thereof, a computer program comprising program code means for performing the steps of any of the embodiments of the method of the present invention when said program is run by a control unit. The present invention also comprises, according to an aspect thereof, a computer readable medium carrying a computer program comprising program code means for performing the steps of any embodiment of the method when said program product is run by a control unit. Finally the present invention comprises, according to an aspect thereof, the control unit provided for controlling energy flows of a vehicle as previously has been disclosed.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

DETAILED DESCRIPTION

With reference to the appended figures, below follows a more detailed description of example aspects of the present invention.

Figure 1:
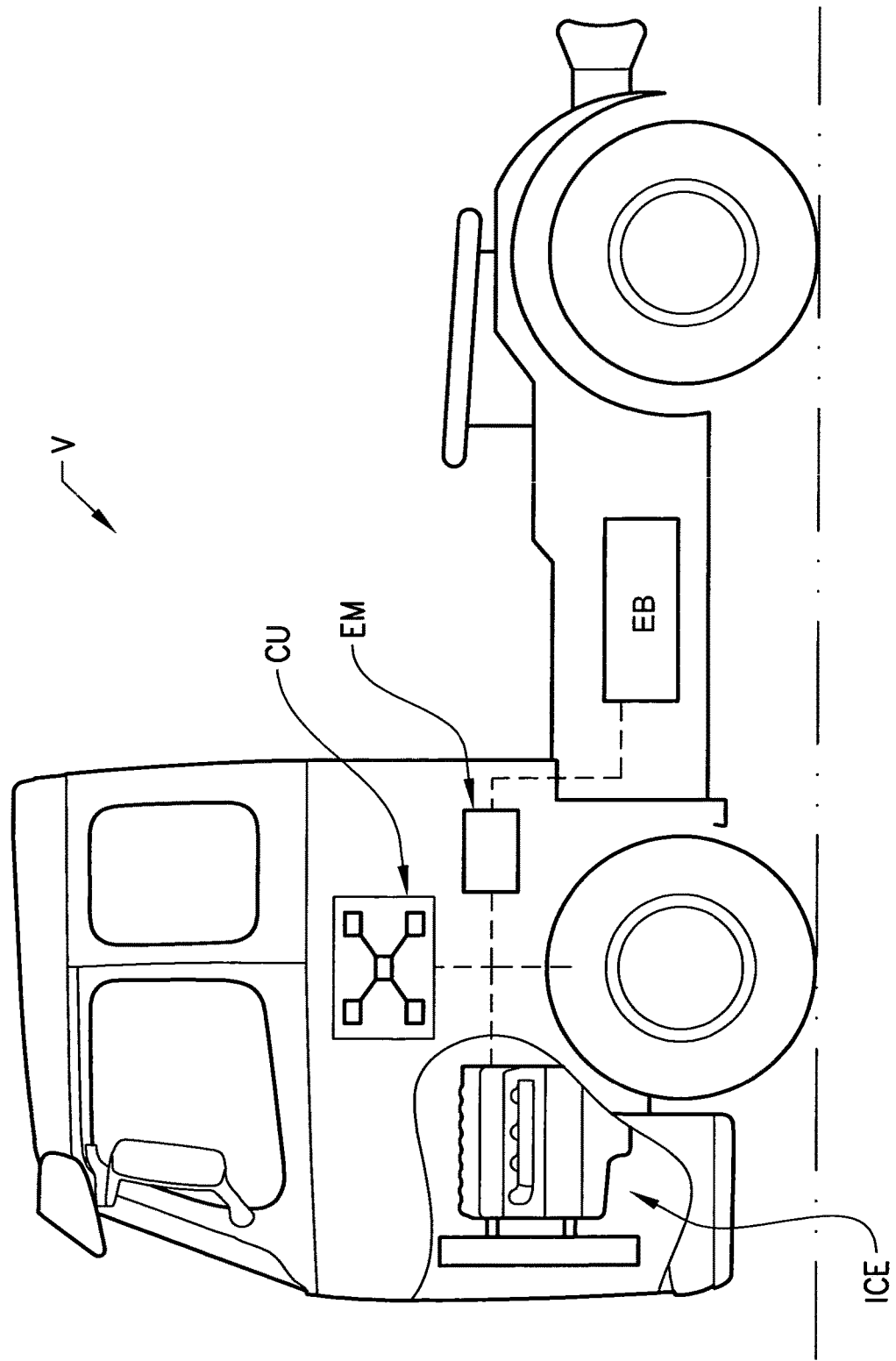
FIG. 1 shows a schematic view of a heavy duty hybrid vehicle comprising a control unit applying the method of the present invention.

FIG. 1 discloses a schematic view of a heavy duty hybrid vehicle V comprising an internal combustion engine ICE, an electric machine EM, an energy buffer EB in form of an electrical battery and a control unit CU for controlling, energy flows of said heavy duty hybrid vehicle V. The electrical battery EB is connected to the internal combustion engine ICE via the electric machine EM. The control unit CU is provided such that the internal combustion engine ICE, the electric machine EM and the energy buffer EB can be controlled. The method of the present invention is performed by the control unit CU and is suitable to apply for the vehicle V. In the embodiment of the present invention disclosed in FIG. 1 the control unit CU is schematically depicted as one physical component. However, as is obvious for a person skilled in the art, the control unit CU may also comprise of numerous of vehicle functionality control units interacting as one vehicle control unit.

Figure 2:
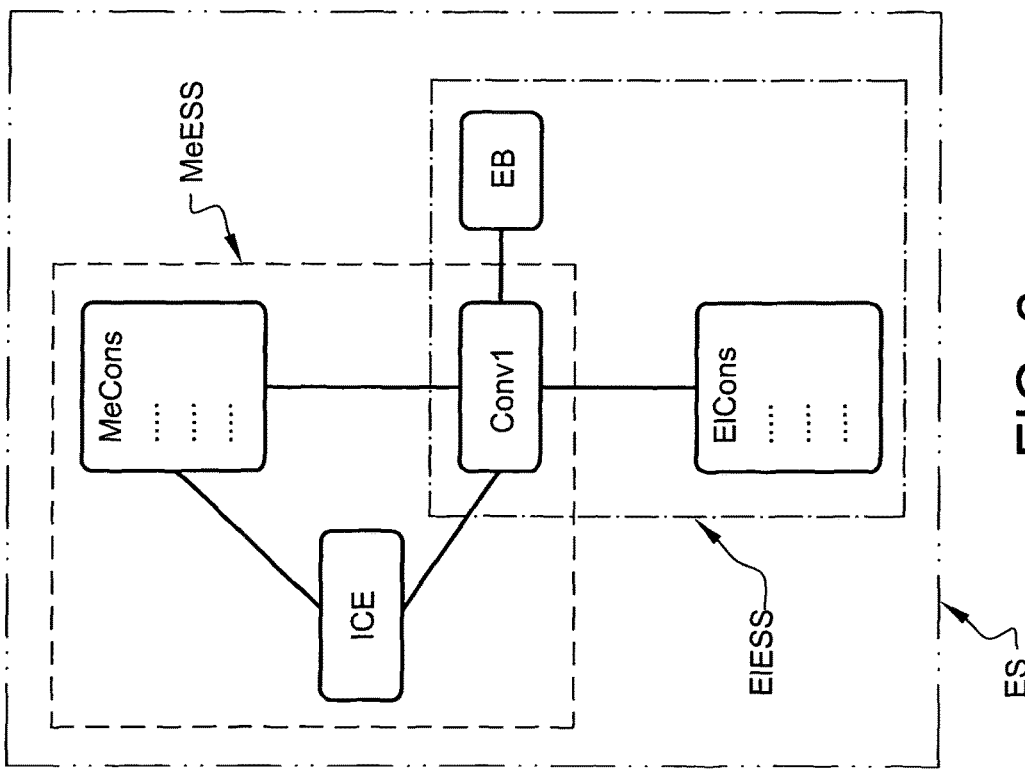
FIG. 2 shows an example of a simplified energy system.

FIG. 2 shows an example of a simplified energy system ES of a heavy duty hybrid vehicle V as of the example disclosed in FIG 1. The energy system ES comprises a mechanical energy subsystem MeESS and an electrical energy subsystem ElESS. The mechanical energy subsystem MeESS comprises an internal combustion engine ICE and a number of auxiliary systems MeCons consuming mechanical energy. Such mechanically driven auxiliary system may e.g. be any of, but not limited to, a cooling fan, a compressor or a generator. The internal combustion engine ICE is considered to be an energy producer for the mechanical energy subsystem MeESS. The mechanical energy subsystem MeESS additionally comprises an energy converter Conv1 converting mechanical energy to electrical energy or vice versa. Such converter may e.g. be an electric machine. The electric machine is a common bidirectional converter Conv1 between the mechanical energy subsystem MeESS and the electrical energy subsystem ElESS. The common converter Conv1 is considered to be either an energy consumer or an energy converter, depending on which energy subsystem MeESS, ElESS that is considered and between which energy subsystems MeESS, ElESS energy is provided. If the electric machine converts a surplus of mechanical energy from the mechanical energy subsystem MeESS to the electrical energy subsystem ElESS the converter Conv1 is considered to be a consumer in the mechanical energy subsystem MeESS and a producer in the electrical energy subsystem ElESS. During periods where additional energy is needed for propulsion the converter Conv1 may instead convert electrical energy from the electrical energy subsystem ElESS to mechanical energy provided to the mechanical energy subsystem MeESS, wherein the converter Conv1 acts as a consumer in the electrical energy subsystem ElESS and as a producer in the mechanical energy subsystem MeESS.

Except for the convener Conv1 the electrical energy subsystem ElESS comprises a number of electrically driven auxiliary systems ElCons consuming electrical energy. Examples of electrically driven energy consumers are e.g. a seat heating systems, a power steering system and fog lights. The electrical energy subsystem ElESS also comprises an energy buffer EB. Such energy buffer EB may e.g. be an electrical battery.

The electrical battery EB is charged with electrical energy from the electrical energy subs stem ElESS during periods with a surplus of available electrical energy and subsequently provide energy to the electrical energy subsystem ElESS during energy buffer discharge periods where additional electrical energy is needed in the electrical energy subsystem ElESS.

When there is a surplus of electrical energy the unitary energy price for the electrical energy subsystem ElESS will be low, and as long as the electrical battery EB is not essentially fully charged, the unitary energy price of the electrical energy subsystem ElESS will be lower than the buffer energy price. Thus, the energy will be provided from the electrical energy subsystem ElESS to the electrical battery EB such the electrical battery EB is charged. When there is a lack of electrical energy within the electrical energy subsystem ElESS the unitary energy price will be very high, most definitely higher than the energy buffer price as long as the electrical battery EB is at least partially charged, wherein electrical energy will be provided from the electrical battery EB to the electrical energy subsystem ElESS.

Another example of an energy buffer is a vehicle compartment thermal system. On a hot summer day, when the driver requested compartment temperature is set below the ambient temperature and below the current compartment temperature, when the vehicle is idling the mechanical energy generated by an internal combustion engine may be used to cool down the vehicle compartment by converting mechanical energy to thermal energy by a mechanically driven air condition compressor. When driving downhill, where only a moderate amount of mechanical energy is needed for the propulsion of the vehicle, which otherwise consumes the main part of the generated mechanical energy, the unitary energy price for mechanical energy will be low. This enables that the vehicle compartment may be cooled down even slightly more than what the driver has requested since there will be a surplus of mechanical energy. Thus, cooling energy will be buffered by the vehicle compartment thermal system.

The different exemplifying components ICE, MeCons, Conv1, ElCons, EB, and how energy is provided between respective components ICE, MeCons, Conv1, ElCons, EB, is controlled by the control unit CU.

Figure 3:
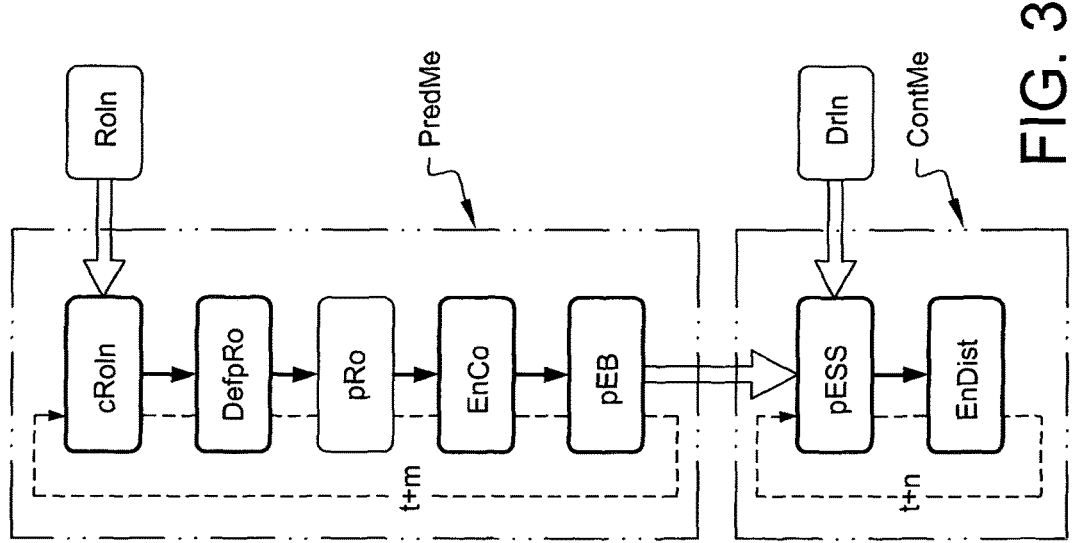
FIG. 3 shows schematic block diagram over a preferred aspect of the present invention.

FIG. 3 shows a schematic block diagram over an embodiment of the how the control unit CU is managing the energy flows between energy subsystems MeESS, ElESS such as the one disclosed in FIG. 2, of a hybrid vehicle V such as the one disclosed in FIG. 1. The energy system ES comprises a number of energy subsystems MeESS, ElESS and within respective energy subsystem one form of energy is used. Energy is provided between respective energy subsystems MeESS, ElESS by energy converters Conv1, capable of converting one form of energy to another form of energy, and energy can be stored within respective energy subsystem ElESS by energy buffers EB.

The embodiment of the method disclosed in FIG. 3 comprises a predictive part method PredMe and a continuous part method ContMe, both performed by the control unit. The predictive pan method PredMe comprises a vehicle travel route information collecting operation cRoIn, a part route defining operation DefpRo, an engine consumption calculation operation EnCo and an energy buffer price calculation operation pEB. The predictive part method PredMe is initiated by that vehicle travel route information RoIn is collected in the vehicle travel route information collecting operation cRoIn for a predefined travel route. The predefined travel route may be any suitable predefined route, wherein such suitable route e.g. may be based on the route for which reliable vehicle travel route information is available, may be set as a predefined time period ahead with the current vehicle speed or may be a set as a predefined upcoming travel distance. The collected vehicle travel route information RoIn from the vehicle travel route information collecting operation cRoIn is subsequently used to define a number of upcoming part routes pRo in the part route defining operation DefpRo, wherein the part routes pRo predominantly are determined based on topography of the predetermined travel route. The vehicle travel route information RoIn enables that the energy consumption for respective part route pRo can be calculated and summed up to an energy consumption over the entire vehicle travel route. This is performed in the engine consumption calculation operation EnCo.

The energy consumption is dependent on aspects such as; topography for respective part route—wherein the topography may reveal energy consumption affecting aspects such as if there are steep inclinations during respective part route or if respective part route comprises long downhill drives where regeneration is possible, speed limits for respective part route and real time information such as construction work or traffic jams, to mention a few. The more accurate the provided vehicle travel route information RoIn is, the more accurate will the estimated energy consumption be. Which information that is relevant for assessing energy consumption is disclosed in prior art and is not a part of the present invention per se.

For all energy buffers EB of the energy subsystems ElESS the estimated energy consumption is subsequently used in the following predictive energy buffer price calculation operation pEB for calculating a predicted energy buffer price for respective energy buffer EB.

The calculated predicted energy buffer price for respective energy buffer EB is subsequently set to be the respective energy buffer price for respective energy buffer. The set energy buffer price is fed to a unitary energy price calculating operation pESS of the continuous part method ContMe.

The predictive part route method PredMe is performed by the control unit CU according to a second sample frequency S2, having a second sample frequency t+m.

The continuous part method ContMe comprises the steps of calculating unitary energy price operation pESS and energy distribution operation EnDist. The energy buffer price from the energy buffer price calculation operation pEB and driver/vehicle information input DrIn is used during the calculating unitary energy price operation pESS in order to calculate unitary energy prices for respective energy subsystem MeESS, ElESS. The calculated unitary energy prices of respective form of energy of respective energy subsystem MeESS, ElESS is subsequently used to determine how energy should be distributed between respective energy subsystems MeESS, ElESS. The driver/vehicle information input DrIn comprises information needed in order to calculate the unitary energy prices of respective energy subsystem MeESS, ElESS. The information may comprise information such as acceleration requested by the driver, current SoC of respective energy buffer, the need of energy of respective auxiliary system such as e.g. power steering, vehicle head lights, air condition system or like. Which information that the driver/vehicle information input DrIn comprises is at least dependent on which pricing method that is used for calculating the unitary energy price.

The determined distribution of energy between the energy subsystems is subsequently performed during the energy distribution operation EnDist.

The continuous part route method ContMe is performed by the control unit CU at a first sample frequency S1, having a first sample frequency t+n. The first sample interval t+n is preferably shorter than the second sample interval t+m.

By also considering upcoming part route pRo when determining how the available energy should be distributed between the energy subsystems MeESS, ElESS, not only can the available energy be more efficiently distributed between the energy subsystems MeESS, ElESS but also, energy buffers EB such as e.g. an electrical battery can be used in an optimised manner such that excessive charging and discharging cycling can be avoided. This will prolong the lifetime of the energy buffers. It is also possible to utilise the maximum capacity of the energy buffers in a more efficient manner. Since future periods where charging of a bullet is possible can be predicted, such as charging of an electrical battery by brake regeneration during a long downhill drive, it is possible to if appropriate fully drain an electrical battery in a way that otherwise is undesirable. Completely draining an electrical battery without knowing that it will be recharged in a very near future might e.g. significantly limit the engine response if draining of the electrical battery occurs at the same time as there is a large need of energy for propulsion of the vehicle.

All operations cRoIn, DefpRo, EnCo, pEB, pESS, EnDist are performed by the control unit CU.

Figure 4:
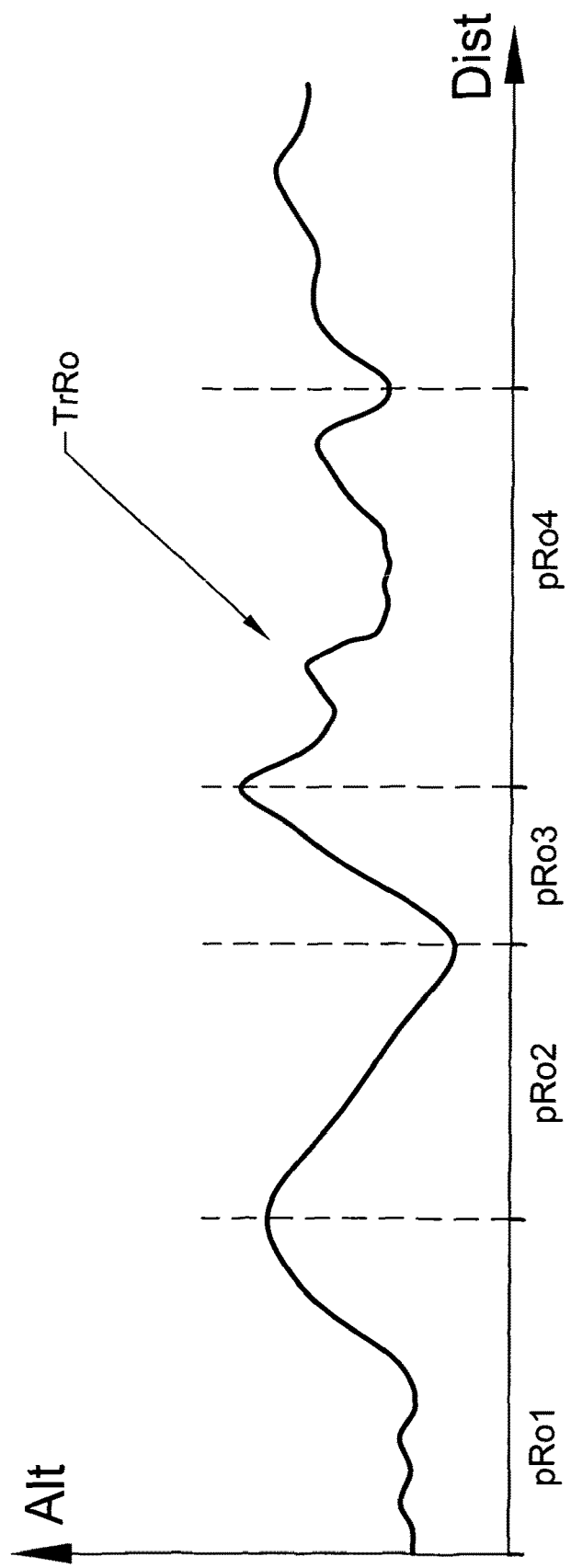
FIG. 4 shows an example of a travel route shown in an altitude vs. distance diagram.

FIG. 4 shows an example of a curve representing a vehicle travel route TrRo shown in an altitude versus distance diagram, wherein altitude is shown at the y-axis, Alt, and distance on the x-axis, Dist. Thus, FIG. 4 shows the topography over distance for the vehicle travel route TrRo. The vehicle travel route TrRo is divided in part routes pRo1, pRo2, pRo3 pRo4. Respective part route pRo1, pRo2, pRo3, pRo4 is primarily defined based on the topography. The topography over a normal distance generally comprises a number of ups and downs. Based on such topography respective part route pRo1, pRo2, pRo3, pRo4 is preferably set to include the upcoming route either to the end of a long climbing or to the end of a long downhill run.

Note that the energy subsystems MeESS, ElESS schematically disclosed in the very simplified embodiment shown in FIG. 2 are just two examples of energy subsystems. In reality a vehicle comprises a very large number of energy subsystems between which energy can be provided by applying the method of the present invention performed by the control unit CU.

If an energy buffer of an energy subsystem is charged or discharged, and at what rate such charging/discharging is performed, during a part route pRo1, pRo2, pRo3, pRo4 is determined by the energy buffer price.

The energy buffer price is continuously updated over respective the part route pRo1, pRo2, pRo3, pRo4, but ideally the estimated energy buffer price set by the control unit CU in the beginning of a part route stays essentially constant over the part route. If the energy buffer price is essentially constant over the part route pRo1, pRo2, pRo3, pRo4 this indicates that the first calculation of the predicted energy buffer price performed by the control unit CU was correct.

It is to be understood that the present invention is not limited to the embodiments described above and illustrated in the drawings; rather, the skilled person will recognize that many changes and modifications may be made within the scope of the appended claims.

The invention claimed is:

1. Method performed by a control unit to control energy flows of a vehicle, wherein the vehicle comprises an energy system, wherein the energy system comprises a plurality of enemy subsystems, wherein within each energy subsystem one form of energy is used and each energy subsystem comprises:
   at least one energy consumer,
   at least one energy producer,
   at least one common converter,
and wherein at least one energy subsystem comprises:
   at least one energy buffer,
the method comprising:
   continuously setting, via the control unit at a first sample frequency,
   a respective unitary energy price for respective energy subsystem for a first sample interval t+n; and
   during a second sample frequency having a second sample interval of t+m, via the control unit
      collecting a vehicle travel route information for an predefined travel route;
      defining an upcoming part route dependent on the vehicle travel route information (RoIn),
      estimating an energy consumption over the part route for each energy subsystem based upon the vehicle travel route information (RoIn),
      calculating a predictive energy buffer price for respective energy buffer for the part route dependent at least on the estimated energy consumption, and
      setting a respective energy buffer price to be the predicted energy buffer price during the next second sample interval t+m,
wherein for energy subsystems comprising at least one energy buffer the unitary energy price is dependent on respective energy buffer price, and during the first sample interval t+n the control unit providing a quantity of power to a first energy subsystem from a second energy subsystem, wherein the provided quantity of power corresponds to a determined supplied quantity of power of the common converter at the unitary energy price of the first energy subsystem.

2. Method according to claim 1, wherein the first sample interval t+n is shorter than the second sample interval t+m.

3. Method according to claim 1, wherein the calculating of the energy buffer price for each energy subsystem is directly dependent on the energy consumption over the part route, and a length of the part route such that an average consumption of a part route corresponds to a specific energy buffer price.

4. Method according to claim 1, wherein the calculating of an energy buffer price for each energy subsystem is dependent on a calculated average energy buffer price for the vehicle travel route.

5. Method according to claim 4, wherein the average energy buffer price is calculated dependent on at least one of a whole upcoming vehicle travel route, a historical average energy buffer price, and an average energy buffer price for a similar part route.

6. Method according to claim 1, wherein the energy buffer price is dependent on an actual State of Charge of an energy buffer at a beginning of a time period t+m.

7. Method according to claim 1, wherein the unitary energy price is dependent on a desired State of Charge of a respective energy buffer at an end of the part route.

8. Method according to claim 1, wherein the upcoming part route is dependent on at least a topography of an upcoming vehicle travel route and a desired state of charge at a specific point of the upcoming part route.

9. Method according to claim 8, wherein the upcoming part route is further dependent on a predictive vehicle speed profile.

10. Method according to claim 8, wherein the defining of the upcoming part route is further dependent on buffer maximum and minimum values, such that predetermined buffer parameters are held within these maximum and minimum values.

11. Method according to claim 1, wherein each energy producer is provided with an energy supply-price function,
wherein the energy supply-price function is providing the relation between price and quantity for the power respective energy producer is able to provide to an energy subsystem, and each energy consumer is provided with an energy demand-price function,
wherein the energy demand-price function is providing the relation between price and quantity for the power respective energy consumer demands from an energy subsystem,
wherein respective energy supply-price function and respective energy demand-price function is dependent on parameters specific for respective energy producer and energy consumer, wherein to set the unitary energy price for a quantity of energy for respective energy subsystem the control unit is;
summarising the energy supply-price functions of energy producers providing power to an energy subsystem into an aggregated supply-price function,
summarising the energy demand-price functions of energy consumers demanding energy from the energy subsystem into an aggregated demand-price function,
wherein the unitary energy price for a quantity of energy of the energy subsystem is provided by that the control unit further is: comparing the aggregated supply-price function and the aggregated demand-price function of the energy subsystem (MeESS; ElESS) whereby the unitary energy price is set to a value corresponding to the unitary energy price where the energy supply and the energy demand is equal.

12. A computer comprising a computer program for performing the steps of claim 1 when the program is run by the computer.

13. A non-transitory computer readable medium carrying a computer program for performing the steps of claim 1 when the program is run by a control unit.

14. A control unit for controlling energy flows of a vehicle, the control unit being configured to perform the steps of the method according to claim 1.

* * * * *